United States Patent [19]

Rochester, Jr.

[11] Patent Number: 4,710,591

[45] Date of Patent: Dec. 1, 1987

[54] EMI/RFI SHIELDING ASSEMBLY FOR CATHODE RAY TUBE MONITORS

[75] Inventor: Charles R. Rochester, Jr., Upper Darby, Pa.

[73] Assignee: Unisys Corporation, Detroit, Mich.

[21] Appl. No.: 924,428

[22] Filed: Oct. 6, 1986

[51] Int. Cl.$^4$ ............................................. H05K 9/00
[52] U.S. Cl. ................................ 174/35 GC; 358/245
[58] Field of Search ........................ 174/35 R, 35 GC; 219/10.55 D; 358/245, 246, 247

[56] References Cited

U.S. PATENT DOCUMENTS 3,952,152  4/1976  Lill et al. ............................... 358/245
4,247,737  1/1981  Johnson et al. ............ 174/35 GC X
4,623,752  11/1986  Steen et al. ................. 174/35 MS X

*Primary Examiner*—Arthur T. Grimley
*Assistant Examiner*—David A. Tone
*Attorney, Agent, or Firm*—Mark T. Starr; Francis A. Varallo

[57] ABSTRACT

The present disclosure describes a shielding assembly which finds particular application in the suppression of electromagnetic emissions from the face of a CRT mounted in a metal chassis. The assembly effects an emissions seal with two electrical terminations. A filter window with two contiguous but non-coextensive glass plates which provide a ledge around the window periphery is provided. An O-ring disposed on said ledge and wrapped with a sleeve of the fine metallic mesh laminated between the glass plates is compressed against a metallic bezel for a first termination. An EMI/RFI shielding gasket assembly is interposed between the bezel and the chassis to provide a second termination.

9 Claims, 6 Drawing Figures

EMI/RFI SHIELDING ASSEMBLY FOR CATHODE RAY TUBE MONITORS'

REFERENCE TO COPENDING APPLICATION

In view of the fact that the present invention includes a gasket assembly for EMI/RFI shielding as described and claimed in U.S. application Ser. No. 685,400, filed Dec. 24, 1984, entitled "Double-Action Gasket Assembly for EMI/RFI Shielding" by Grant F. Steen and Michael Holloway, now U.S. Pat. No. 4,623,752 issued Nov. 18, 1986, such application is referenced herein. The assignee of the present application is a wholly-owned subsidiary of the assignee of the referenced application.

BACKGROUND OF THE INVENTION

In the operation of electronic equipment, it is necessary to shield against electromagnetic emissions. One such source of emissions is the face of a cathode ray tube (CRT), particularly that employed in a color monitor.

A presently used shielding arrangement uses a filter window permanently adhered to a plastic bezel and positioned adjacent the tube face. The window is comprised of a pair of coextensive curved glass plates having a fine copper mesh laminated therebetween. The mesh protrudes from the plates on all sides thereof, forming a sleeve, the extremity of which is wrapped about a core of insulative material to form a ring-like resilient member. Shielding is effected by clamping the last mentioned member to the metal chassis housing the electronics for the CRT. Clamping has been accomplished through the use of flat metal plates and a relative large number of associated screws for compressing the member.

A number of problems are present in the foregoing shielding arrangement, particularly as to shielding integrity and cost of manufacture. For example, removal of the member for the purpose of servicing the electronics in the chassis may result in unacceptable emissions when the seal is reestablished. Also, since the bezel is permanently affixed to the glass filter, the entire bezel assembly must be discarded. The same is true if the glass filter is cracked. As to cost, the preparation of the bezel assembly, preferably by the glass filter manufacturer, results in increased manufacturing and shipping costs. Moreover, the implementation of the EMI/RFI seal by installation of the large number of screws in the compression plates, results in increased assembly time.

What is desired is a shielding arrangement in which: the bezel and glass filter are separate entities, capable of being easily assembled and disassembled; the assembly time is reduced through the elimination of the compression plates and screw fasteners; and most significantly, the reproducibility factor with respect to EMI/RFI integrity is greatly increased. The assembly of the present invention fills such a need.

SUMMARY OF THE INVENTION

In accordance with the present invention, there is provided a CRT monitor shielding assembly comprised of an improved filter window and bezel design. The filter window itself accommodates a resilient member which includes the internal window mesh. The bezel, which is formed of metallic material, is fastened to the window by clamp assemblies, which also serve to compress the last mentioned member to form a first emissions termination. The metal CRT chassis enclosure includes a double-action EMI/RFI gasket assembly (such as that of the reference application) surrounding the opening adjacent the window. Mounting of the bezel (with the window attached thereto) onto the chassis causes the bezel to compress the gasket assembly, thereby providing a second termination to complete the electromagnetic emissions seal.

More specifically, the filter window is comprised of two glass plates of like curvature and a copper mesh laminated therebetween. In contrast to a window formed of like-dimensioned glass, the window of the present invention includes an outer glass plate which is smaller than the inner plate, such that a ledge is provided around the entire window. The ledge accommodates an O-ring of resilient insulative material upon which the sleeve of the copper mesh is wrapped in a single turn configuration. Since the shielding mesh in the filter window is not in physical contact with the chassis, the bezel and window assembly may be readily removed to provide access to the chassis, and then resinstalled without danger of destroying the integrity of the emissions seal. Damage to the filter window is remedied by removing the bezel and installing a new window therein, and such is easily accomplished on site. Assembly time is reduced as compared to that needed in the aforementioned design, consisting only of the time needed to clamp the window to the bezel and to attach the bezel to the chassis.

Other features and advantages of the present invention will become apparent in the detailed description of the invention which follows.

DESCRIPTION OF THE PREFERRED EMBODIMENT

Figure 1:
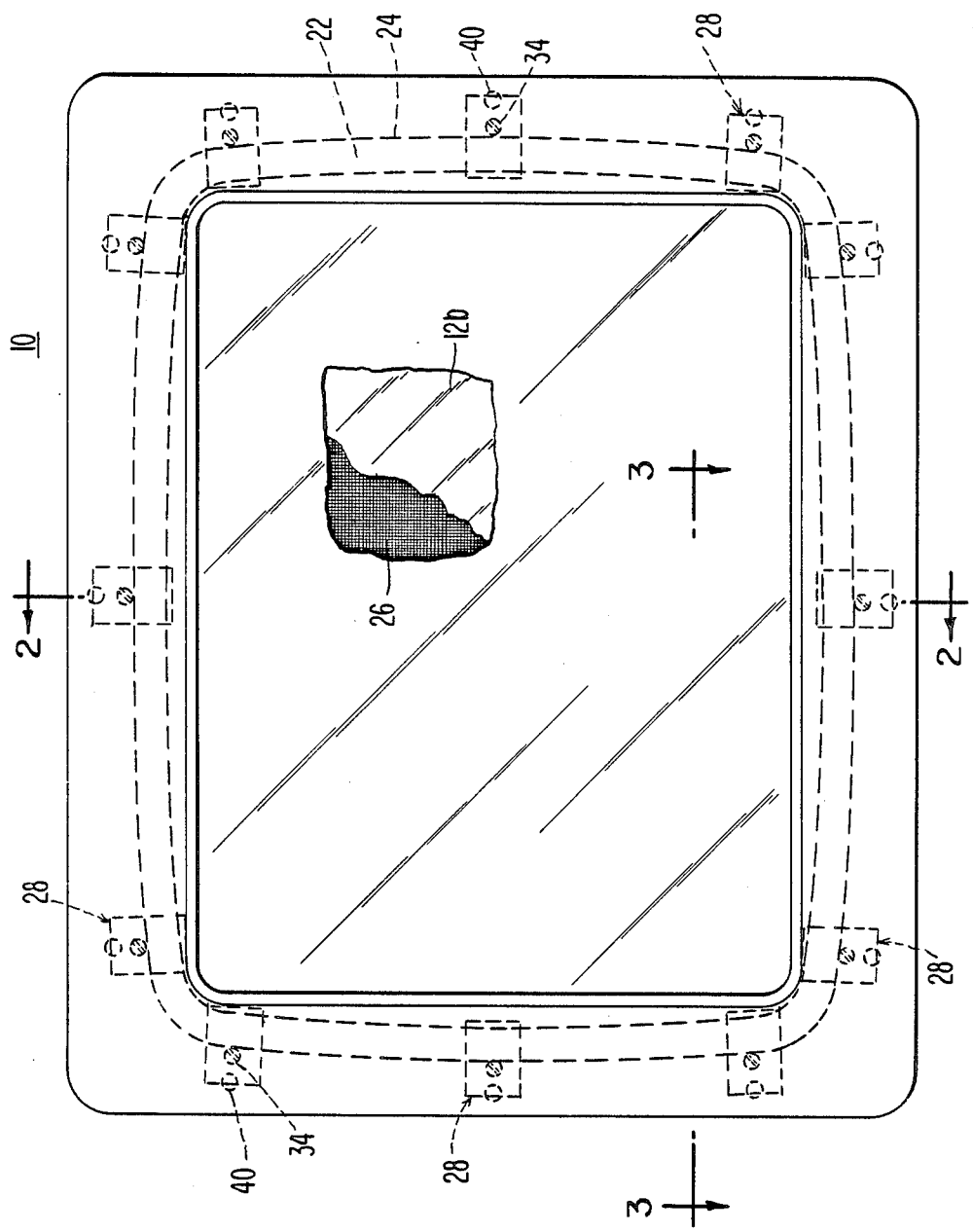
FIG. 1 is a front view of the monitor shielding assembly of the present invention.

FIG. 1 is a front view of a color monitor 10 having a shielding assembly which includes an improved filter window 12 and associated metallic bezel 14. With continued general reference to FIG. 1 and specific reference to FIG. 2, derived therefrom, there are shown in somewhat simplified form, additional components of the monitor. A cathode ray tube 16 shown in phantom, and its associated electronic circuits (not shown), are housed in a metal chassis or weldment 18 having an EMI perforation pattern (not shown) for convection cooling, the latter being contained in a plastic shell or cabinet 20, partially shown in phantom. Shielding of the face of the CRT from electromagnetic emissions is implemented by the assembly of the present invention which includes bezel 14 and its operative electrical engagement with the filter window 12 and the chassis 18.

Figure 5:
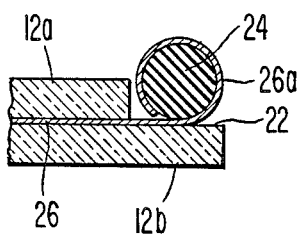
FIG. 5 is an enlarged pictorial view illustrating the disposition of the copper mesh sleeve protruding from the filter window plates and disposed on an O-ring.

The filter window 12 is comprised of a pair of glass plates of like curvature—an outer plate 12a and an inner plate 12b having respective extremities which are noncoextensive. That is, the dimensions of the outer plate 12a are smaller than those of the inner plate 12b, such that a ledge 22 is formed around the periphery of the window 12. The ledge 22 accommodates an O-ring core 24 of resilient insulative material, such as silicone or neoprene. A fine copper mesh 26 of the order of 100 openings per linear inch, as seen particularly in FIG. 1, is laminated between the glass plates 12a and 12b, and its extremities protrude from between the plates along the ledge 22, forming a sleeve 26a. As seen in FIG. 5, the sleeve 26a is wrapped around the core 24 in a single-turn configuration.

As indicated hereinbefore, the emissions seal is effected by two electrical terminations—a first termination resulting from electrical contact between the bezel 14 and the sleeve 26a/O-ring 24 arrangement of the filter window 12, and a second termination by contact between the bezel 14 and the chassis 18. Considering the first termination with particular reference to FIG. 4 and general reference to FIGS. 1 and 2, pressure must be applied to the sleeve-wrapped O-ring core 24 of FIG. 5, by the inner glass plate 12b so that the wrapped core is compressed between the plate 12b and the metallic bezel 14. This is accomplished through the use of clamp assemblies 28 disposed around the periphery of the window 12. FIG. 1 shows a total of twelve clamp assemblies 28 so oriented to make the termination and insure proper mounting pressure for an electrical, as well as an environmental seal.

Figure 4:
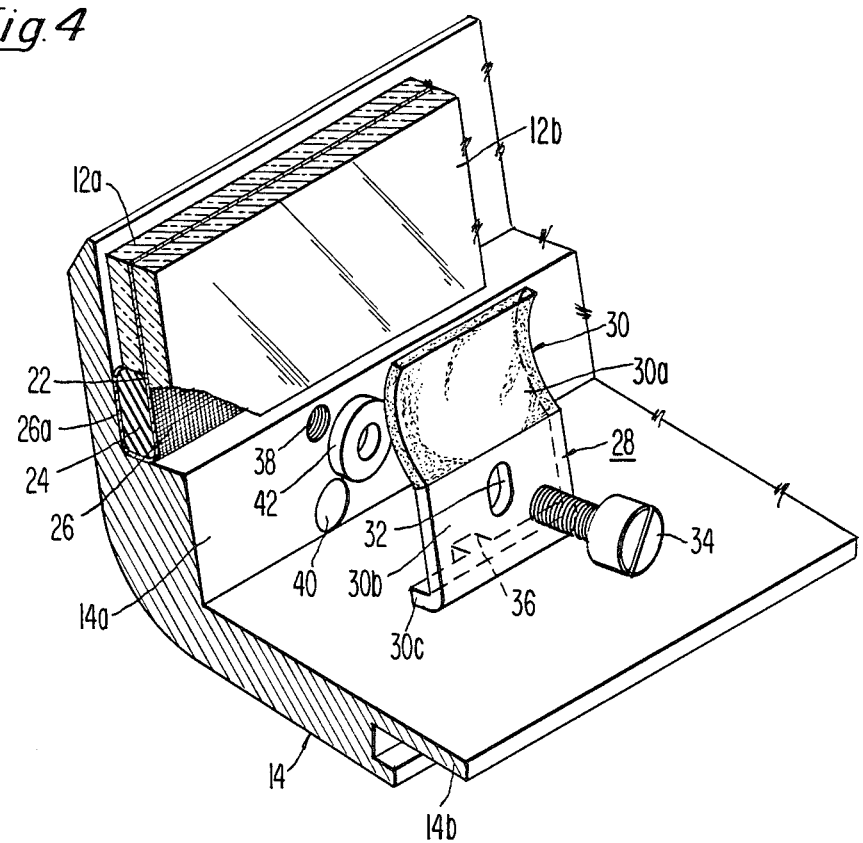
FIG. 4 is a partial pictorial view illustrating the relationship of the filter window and the bezel.

As seen in FIG. 4, the clamp 28 includes a movable member 30 having an arcuate section 30a coated with soft plastic at one extremity thereof, a planar section 30b having a slotted aperture 32 for receiving a mounting screw 34 and an orthogonal section 30c at the opposite extremity—the last mentioned section having a tail-like medial projection 36. Clamp member 30 is designed so that it will not deflect when the screw 34 is torqued for compression of the O-ring 24. Moreover, the physical properties of the O-ring 24 are chosen to be compatible with the desired closure pressure. The arcuate section 30a is designed to contact glass plate 12b and to apply along the line of contact, a pressure normal to its surface, thereby compressing the O-ring 24. The surface of the bezel 14 in contact with the wrapped O-ring is preferably coated with a tin alloy to preclude the corrosive effects of dissimiliar metals.

The bezel 14 includes a tapped hole 38 for receiving screw 34 and an oversized locating hole 40 to accommodate the projection 36. The latter arrangement permits the clamp member 30 to angle upward when the O-ring is in a noncompressed state and also keeps the member from rotating. The depth of the locating hole 40 is chosen such that projection 36 will not bottom therein, thereby permitting the shoulder of section 30c adjacent the projection 36 to contact the surface 14a of the bezel 14. Thus, the clamp member 30 is restrained from tilting as the screw is torqued. Standoff 42 compensates for variations in the window thickness.

Figure 2:
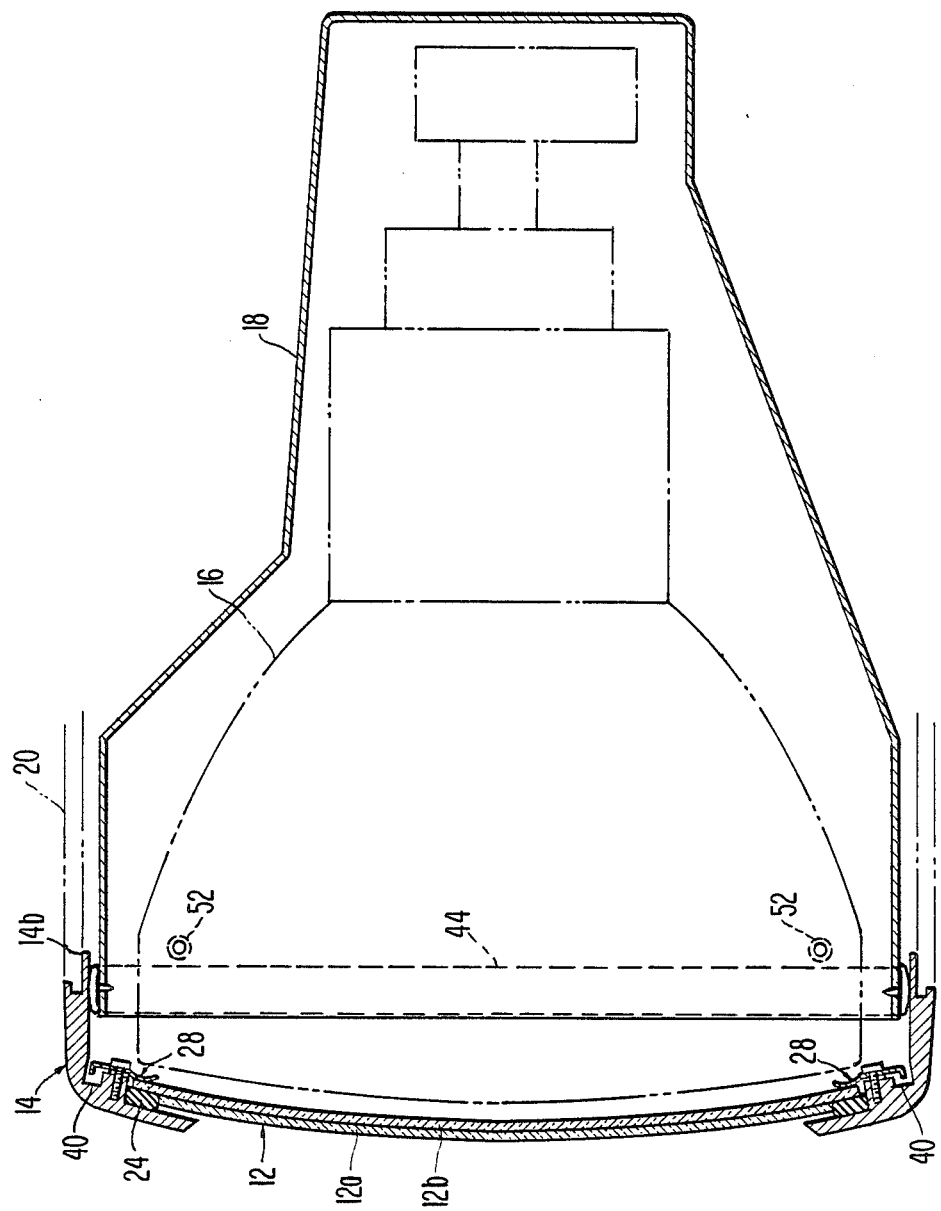
FIG. 2 is a section view of the assembly taken along the line 2—2 of FIG. 1.
Figure 6:
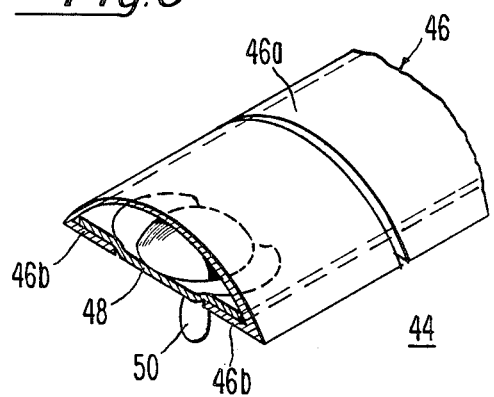
FIG. 6 is a partial pictorial view of a double-action shielding gasket assembly which is mounted completely around the opening in the monitor chassis.

After the bezel/O-ring termination has been accomplished, the secondary termination is effected to perfect the emissions seal. With reference to FIG. 2 and FIG. 6, the bezel/window structure is mounted upon the chassis 18. Surrounding the opening in the chassis, there is disposed a double-action gasket assembly 44 for EMI/RFI shielding as described and claimed in the reference application. Briefly, the gasket assembly 44 is an elongated, articulated beryllium copper structure 46 and a substantially planar stainless steel carrier 48 enclosed thereby. The structure 46 comprises an arcuate section 46a having opposed extremities bent toward each other to form a respective pair of spaced-apart, coplanar sections 46b. The carrier 48 is attached to the chassis 18 surface by rivets 50, but the carrier is offset from the surface to permit the coplanar section 46b to contact the surface and to slide in either direction in response to the wiping of its arcuate section 46a.

Figure 3:
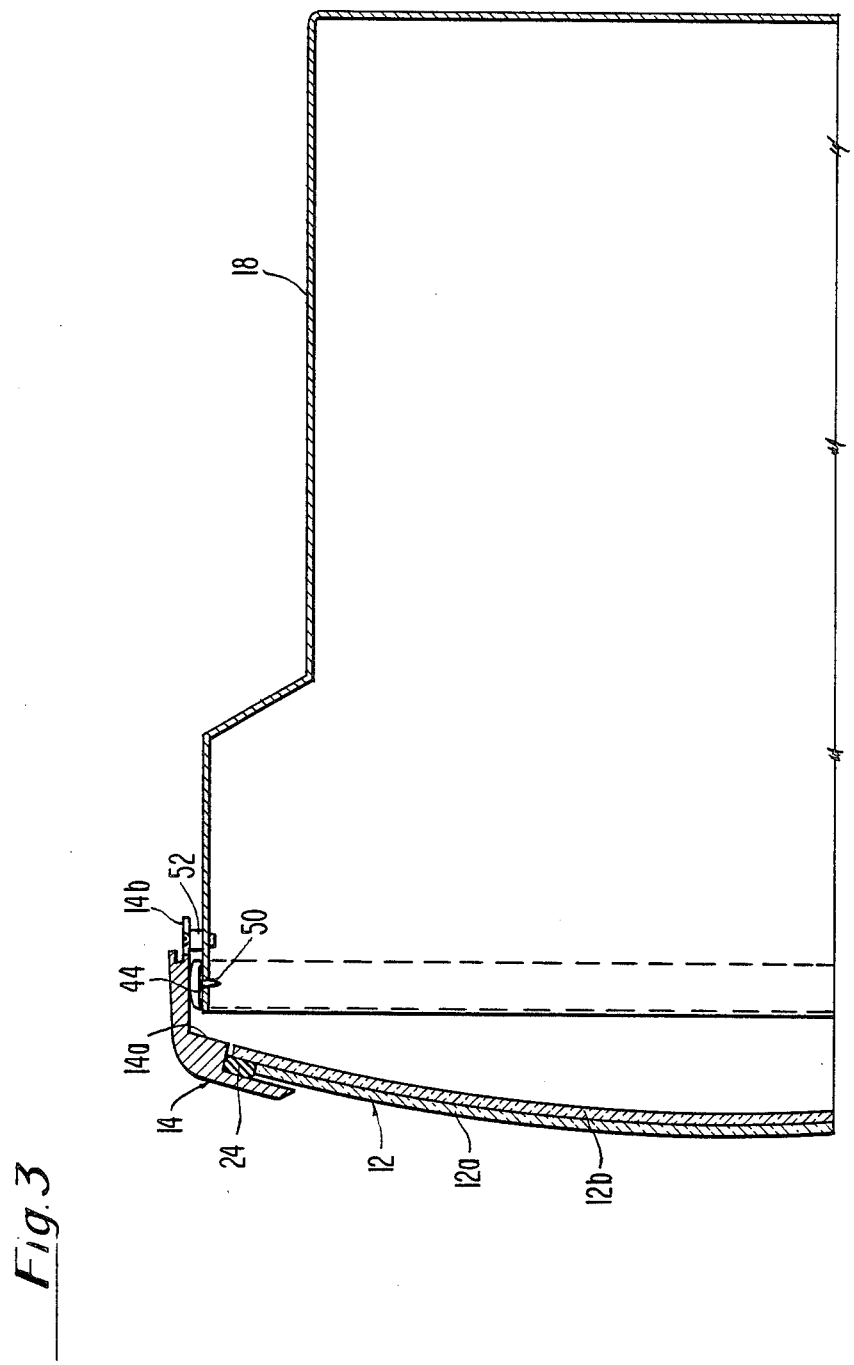
FIG. 3 is a section view of the assembly taken along the line 3—3 of FIG. 1.

Accordingly, as the bezel 14 is pushed onto its mounted position on the chassis 18, the extended portions 14b of the bezel compress the gasket assembly 44, thereby providing effective shielding. The bezel 14 is retained in position by a plurality of knurled lock nuts 52 mounted on the sides of the chassis 18, as seen in FIG. 3 and dotted in FIG. 2. A countersunk beveled slot (not shown) is formed in the bezel extension 14b adjacent each lock nut 52 for receiving a mounting screw (not shown). The lock nuts 52 serve also as a standoff to limit the compression of the gasket assembly 44 to that required for effective shielding. The chassis 18 is conveniently made of light weight aluminum. In order to eliminate the effects of electrolytic corrosion which might occur with contact of aluminum with the beryllium copper of the gasket, the latter is tin plated.

In conclusion, there has been disclosed a shielding assembly which is effective both from the standpoints of shielding and cost. While particular materials and dimensions have been mentioned herein relative to the use of the assembly in conjunction with a color monitor, it should be understood that such information has been presented solely for purpose of example, and is not to be construed as limiting the invention. It is apparent that depending upon the particular application, changes and modifications of the shielding assembly may be desirable. Such changes and modifications, insofar as they are not departures from the true scope of the invention, are intended to be covered by the claims which follow.

What is claimed is:

1. A shielding assembly for suppressing electromagnetic emissions from the face of a cathode ray tube mounted in a metallic chassis comprising:

a filter window positioned in proximity to the face of said cathode ray tube, said filter window being comprised of a pair of contigous glass plates having metallic mesh interposed therebetween, said pair of glass plates including an inner plate situated closest to said face of said cathode ray tube and an outer plate, the corresponding dimensions of said outer plate being smaller than those of said inner plate, whereby a ledge is formed around the periphery of said window, said metallic mesh protruding from said plates as a sleeve along said ledge, a resilient member disposed on said ledge and encircling said filter window, said sleeve being wrapped upon said resilient member, a metallic bezel, clamping means disposed on said bezel for retaining said filter window therein, said resilient member being positioned adjacent the inner surface of said bezel, said clamping means including a movable member having an arcuate section at one extremity thereof, an adjacent planar section having a slot-like aperture therein for accommodating a screw, and a section orthogonal to said planar section at the opposite extremity thereof, said last mentioned section having a tail-like medial projection, said bezel having a tapped hole for receiving said screw and an oversized locating hole to accommodate said projection, said locating hole having a depth greater than the length of said projection, whereby the portion of the orthogonal section adjacent said projection abuts the inner surface of said bezel as said screw is torqued, said arcuate section contacting the surface of said inner glass plate whereby a pressure is applied normal to the glass surface, thereby compressing said resilient member against said bezel and effecting a first electrical termination.

2. A shielding assembly as defined in claim 1 further including means for mounting said bezel on said chassis, an emissions shielding gasket interposed between said mounted bezel and said chassis to provide a second electrical termination, thereby perfecting an emissions seal.

3. A shielding assembly as defined in claim 2 further characterized in that said emissions shielding gasket comprises a double-action, elongated, articulated structure of spring-like material having a substantially planar carrier enclosed thereby, said structure includes an arcuate section having opposed extremities bent toward each other to form a respective pair of spaced-apart, coplanar sections, means for mounting said gasket on the outer surface of said chassis encircling the opening thereof through which said cathode ray tube is mounted, the mounting of said bezel on said chassis causing the bezel to wipe against and to compress said arcuate section of said gasket, thereby establishing electrical contact between said bezel and said chassis.

4. A shielding assembly as defined in claim 3 wherein said resilient member is an O-ring formed of insulative material.

5. A shielding assembly as defined in claim 4 characterized in that said sleeve is wrapped around said O-ring in a single-turn configuration.

6. A shielding assembly as defined in claim 5 wherein said mesh is of copper and contains approximately 100 openings per linear inch.

7. A shielding assembly as defined in claim 6 characterized in that said glass plates are curved with a like radius of curvature.

8. A shielding assembly as defined in claim 7 further including a standoff of predetermined thickness interposed between said planar section of said movable member of said clamping means and said bezel in accordance with the thickness of said filter window.

9. A shielding assembly as defined in claim 8 further characterized in that the surfaces of the arcuate section of the movable member of said clamping means are coated with a soft plastic material.

* * * * *